Dec. 10, 1963 S. H. KAPLAN 3,114,065

COLOR IMAGE REPRODUCER

Original Filed Sept. 6, 1955 3 Sheets-Sheet 1

SAM H. KAPLAN
*INVENTOR.*

BY John J. Pederson

HIS ATTORNEY.

Dec. 10, 1963 S. H. KAPLAN 3,114,065

COLOR IMAGE REPRODUCER

Original Filed Sept. 6, 1955 3 Sheets-Sheet 2

SAM H. KAPLAN
*INVENTOR.*

BY John J. Pederson

HIS ATTORNEY.

Dec. 10, 1963 S. H. KAPLAN 3,114,065

COLOR IMAGE REPRODUCER

Original Filed Sept. 6, 1955 3 Sheets-Sheet 3

SAM H. KAPLAN
*INVENTOR.*

BY John J. Pederson

HIS ATTORNEY.

United States Patent Office 3,114,065

Patented Dec. 10, 1963

3,114,065

COLOR IMAGE REPRODUCER

Sam H. Kaplan, 5706 N. Jersey Ave., Chicago, Ill.

Original application Sept. 6, 1955, Ser. No. 532,723, now Patent No. 2,959,483, dated Nov. 8, 1960. Divided and this application May 11, 1959, Ser. No. 812,416
11 Claims. (Cl. 313—92)

This invention pertains to a new and improved multi-color target structure for a color television image reproducer. This is a division of the co-pending application of Sam H. Kaplan, Serial No. 532,723, filed September 6, 1955, now Patent No. 2,959,483 granted November 8, 1960.

One of the most difficult problems associated with color television image reproducers is the difficulty almost invariably encountered in obtaining adequate brightness and contrast in the reproduced image. The problem is accentuated by the fact that it is undesirable to utilize excessively high operating voltages in image reproducers intended for use in the home and by the fact that most television receivers must provide a picture of adequate visibility without requiring that the room in which they are located be substantially darkened. Of almost equal importance is the fact that achromatic ambient light almost inevitably leads to substantial color desaturation in the reproduced image. The problem is a continuing one and no really adequate solution has thus far been presented, although various expedients have been tried. For example, contrast in the reproduced image may be improved substantially by use of a neutral-density filter on the faceplate of the picture tube and/or by use of a neutral filter interposed between the picture tube and the observer, both of these techniques being well known in the monochrome television art. Filter arrangements of this conventional type, however, make the brightness problem presented by color picture tubes even more acute and are consequently generally unsatisfactory. It has also been proposed that the final anode voltage of the picture tube be increased substantially; this technique, however, tends to add substantially to the cost of the receiver circuitry and presents difficult insulation problems within the receiver.

It is an object of the invention, therefore, to provide a new and improved multi-color target sturcture for a color television image reproducer which effectively increases the contrast ratios obtainable in the reproduced image without substantially impairing image brightness.

It is a more specific object of the invention to provide a new and improved multi-color target structure for a color television image reproducer which effectively absorbs ambient light at the image reproducer viewing screen but does not attenuate the desired light emitted from the target.

It is a further object of the invention to provide a new and improved high-contrast high-brightness color television target structure suitable for use within the envelope of a cathode-ray tube image reproducer.

It is another object of the invention to provide a new and improved color television target structure which substantially reduces color desaturation effects normally caused by reflected ambient light without substantial reduction in efficiency.

A display device of the character described has a light emissive surface with the intensity characteristic of the emitted light varying as a function of the wavelength thereof and having a plurality of spaced maxima and and minima. In accordance with the invention, optical filter means interposed between the light emissive surface and the viewer improves the contrast of the emitted light in the presence of ambient light, the filter means having a light transmission characteristic which complements the intensity characteristic of the emitted light from the surface, having spaced maxima and minima corresponding respectively with the maxima and minima of the intensity characteristic, transmitting substantially without attenuation light of the wavelength emitted by the emissive surface, and attenuating ambient light of wavelengths other than those emitted by the emissive surface.

The invention, in one aspect, is directed to a multi-color target structure for a color television image reproducer of the type comprising an evacuated envelope having a transparent faceplate, a multi-color luminescent target positioned within the envelope for viewing through the faceplate, and means for subjecting the target to controlled electron bombardment to produce an image thereon in a plurality of primary colors. A target constructed in accordance with the invention comprises a first color target group including a multiplicity of first target elements distributed in a predetermined geometric pattern throughout a preselected image screen area. Usually, this image screen area comprises the entire internal surface of the tube faceplate, but it may comprise a limited area of the faceplate surface or may constitute the surface of a separate target structure substrate. Each of these first target elements comprises a luminescent material which emits light predominantly restricted to a first one of the above-mentioned primary colors when subjected to electron bombardment and a color filter material which exhibits a relatively high transmission efficiency for light in a predetermined spectral range including only that first one of the primary colors and a relatively low transmission efficiency for light in the remainder of the visible spectrum. The color filter material in the target element is in intimate contact with the luminescent material and is at least partially interposed between the luminescent material and the tube faceplate. The filter and luminescent materials may comprise discrete layers or may be intermixed with each other. The target structure further comprises a second target group including a multiplicity of second target elements which are interspersed, throughout the image screen area, with the first group of target elements. Each element of the second group comprises a combination of luminescent material and color filter material similar to the first target elements except that the constituent materials of the second group of color target elements emit and selectively transmit light of a second one of the primary colors. In a tri-color image reproducer, of course, a third group of similar color target elements are utilized for emitting and selectively transmitting light of a third primary color.

One of the essential features of multi-color target structures constructed in accordance with the invention is the use of color filters within the envelope of the cathode-ray image reproducer. Conventional filter materials are completely unsatisfactory for this purpose. For example, gelatinous materials are most frequently used for color filtering but are completely unsatisfactory for use within a cathode-ray tube because their presence prevents complete evacuation of the tube envelope and because they tend to decompose when subjected to electron bombardment. To overcome these difficulties, it is necessary to provide color filter materials having the desired spectral transmission characteristics which are suitable for use in high-vacuum cathode-ray tubes and which will not interfere with normal manufacturing procedures employed in producing the cathode-ray tubes.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

*Target Structure*

Figure 1:
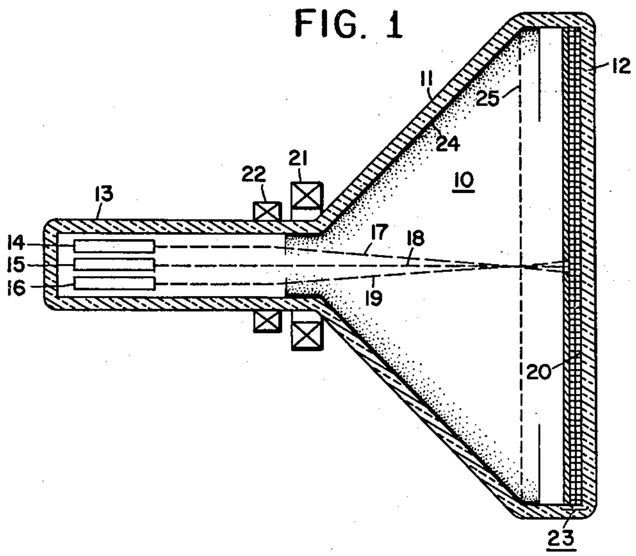
FIGURE 1 is a cross-sectional view, partly schematic, of a color television image reproducer including a preferred embodiment of a multi-color target structure constructed in accordance with the invention.

The color television image reproducer 10 in FIGURE 1 is generally conventional in construction and comprises an envelope 11 having an enlarged transparent faceplate section 12 and the usual neck section 13. Three electron guns 14, 15 and 16 are positioned within neck section 13 and are employed to project three individual electron beams 17, 18 and 19 toward the internal surface 20 of faceplate 12. Image reproducer 10 is provided with the usual deflection-control system comprising a deflection yoke 21; the image reproducer may also include a convergence system represented in the drawing by a convergence coil 22 for converging electron beams 17–19 in the region adjacent faceplate 12. A multi-color luminescent target structure 23 is supported upon faceplate 12 and is utilized in the image reproducer to develop an image in a plurality of primary colors in response to controlled electron bombardment by electron beams 17–19; the construction of the color target is described in detail hereinafter in connection with FIGURE 2. The internal surface of envelope 11 adjacent color target 23 is provided with a conductive coating 24 which extends back into neck section 13 of the envelope. Conductive coating 24 may comprise the usual metallic coating, preferably formed of aluminum, or may constitute a coating of colloidal graphite or other conductive material. Image reproducer 10 also includes a color-selection barrier 25 which may be of the conventional parallax type. If preferred, a deflection-type color-selection barrier may be utilized as element 25 in the image reproducer.

Image reproducer 10 is a generalized illustration of a color picture tube which is entirely conventional in construction except for target structure 23. In operation, the three electron beams 17, 18 and 19 developed by guns 14, 15 and 16 are utilized to selectively excite different portions of target structure 23 to produce a colored image visible through transparent faceplate 12. Color-selection may be achieved by any of the several known techniques, as noted above, including the use of an accelerating electrical field between target structure 23 and color-selection barrier 25 to achieve the increased brightness generally provided by post-deflection-acceleration operation. The three electron guns may be replaced by other well-known excitation arrangements, such as a single electron gun provided with a deflection system to direct the beam produced by the gun to three different points of apparent origin.

Figure 2:
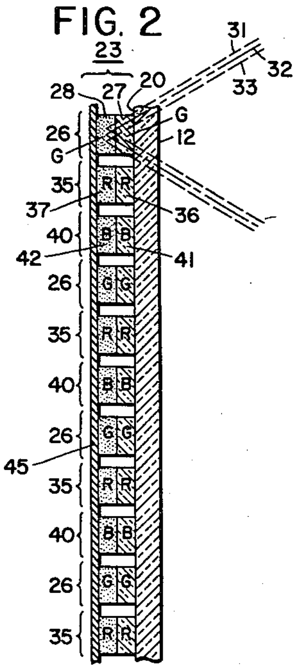
FIGURE 2 is an enlarged cross-sectional view of a portion of the target structure of the image reproducer of FIGURE 1.

The apparatus aspect of the invention is based solely upon the structure of luminescent target 23, one embodiment of which is illustrated in enlarged cross-sectional detail in FIGURE 2. As shown in that figure, the target structure comprises a first color target group including a multiplicity of first target elements 26 distributed in a predetermined pattern upon the internal surface 20 of faceplate 12. In most color image reproducers, the pattern of color target elements extends throughout the area of faceplate 20, although it may be restricted to any other preselected image screen area on the faceplate surface. The color target elements may comprise minute "dots," or may comprise extremely narrow bands extending across the faceplate surface. Each of target elements 26 comprises two discrete layers 27 and 28. Target area layer 27 is formed from a color filter material which exhibits a relatively high transmission efficiency for light in a predetermined spectral range including only one of the primary colors in which the image is to be reproduced; the color filter material of layer 27 further exhibits a relatively low transmission efficiency for light in the remainder of the visible spectrum. The color-transmission characteristic for filter layer 27 is shown by dash line 29 in FIGURE 3; curve 29 is a plot of the transmission efficiency of the filter layer with respect to radiation wavelength and shows that the color filter selectively transmits light of a wavelength corresponding to the selected green primary color and sharply attenuates the red and blue primaries.

Figure 3:
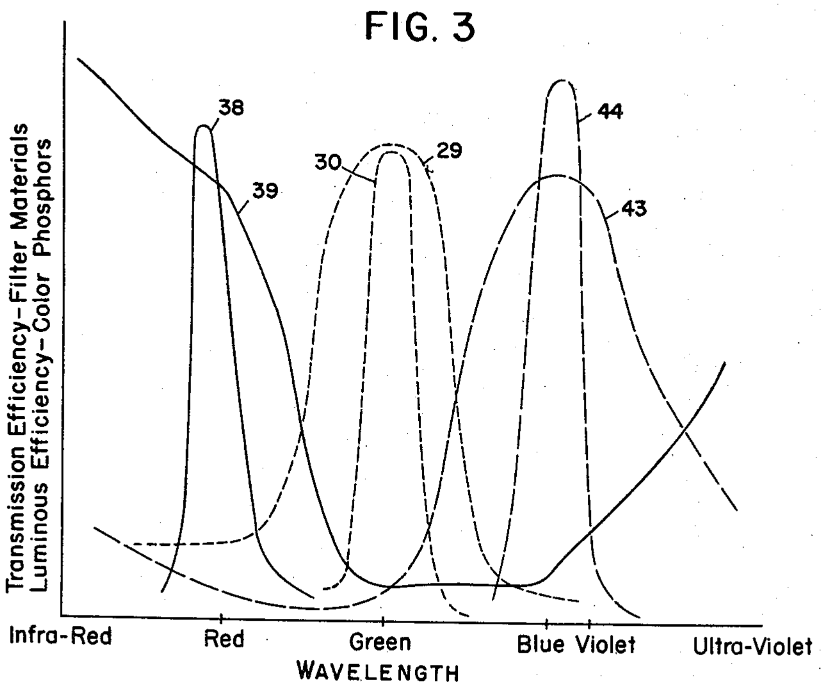
FIGURE 3 is a graphical representation of spectral transmission and emission properties of filter and phosphor materials which may be used in practicing the invention.

The layer of luminescent material 28 included in each of color target elements 26 emits light predominantly restricted to the particular primary color readily transmitted through color filter layer 27. The emission characteristic of phosphor layer 28 is also shown in FIGURE 3 by dash-dot line 30. Color phosphor layer 28, as indicated in FIGURE 2, is in intimate contact with the color filter material of layer 27, and the color filter layer is interposed between phosphor layer 28 and transparent faceplate 12.

It is the interposition of the color filter material between the luminescent material and the viewing screen surface which provides the important operational advantages of the multi-color target structures of the invention. The basic optical phenomenon underlying the substantial improvement in contrast and brightness provided by a target structure 23, as compared with conventional structures, may best be understood by considering the effect of color filter layer 27 upon three impinging rays of ambient light illustrated in FIGURE 2 by dash lines 31, 32 and 33. Line 31 represents light of a wavelength corresponding to red in color, line 32 is for light corresponding to the green primary selected for image reproduction, and line 33 represents light in the blue portion of the spectrum. Because of the selective transmission characteristic provided by color filter layer 27, the red and blue light represented by rays 31 and 33 is sharply attenuated as it passes through filter material 27 and is reflected from the target structure. In fact, the filter attenuates the impinging red light twice, once each time it is required to traverse the filter material. The same effect, of course, is achieved with respect to blue light. Consequently, light of a major portion of the spectrum is absorbed by the filter material and is not reflected from the tube faceplate; this absorbed light cannot reduce contrast values in the image reproduced on target structure 23. The relatively efficient transmission characteristic of filter layer 27 for green light, however, permits transmission of virtually all of the light emitted from color phosphor layer 28; consequently, the brightness of the reproduced image is not substantially reduced by the color filter material.

Target structure 23 further includes a second group of color target elements comprising elements 35 which are interspersed throughout the image screen area with target element group 26. Each of the target elements of the second group comprise a combination of luminescent material and color filter material similar to target elements 26 except that the constituent materials of target elements 35 emit and selectively transmit light of a second one of the primary colors used in reproducing an image on the target structure. Each of target elements 35 comprises a layer 36 of color filter material backed by a layer 37 of color phosphor material. The spectral emission and transmission characteristics of the phosphor and color filter materials of layers 37 and 36 are illustrated by lines 38 and 39 respectively in FIGURE 3. As indicated by these curves, phosphor layer 37 emits light predominantly restricted to the red primary color utilized in image reproduction on target 23; filter material 36 has a relatively high transmission efficiency for a limited spectral range including the red primary color and substantially attenuates light in the remainder of the visible spectrum.

The tri-color target structure 23 also includes a third group of target elements 40 which are essentially similar in structure to target elements 26 and 35. Each of color target elements 40 includes a color filter layer 41 and a color phosphor layer 42, the color filter being interposed between the phosphor and surface 20 of target substrate 12. Target elements 40 each selectively emit and transmit light corresponding to the blue primary color; the transmission efficiency characteristic of color filter 41 is shown by curve 43 in FIGURE 3 and the luminous efficiency characteristic of color phosphor 42 is shown by curve 44. Preferably, an electron-transparent aluminum or other conductive film 45 covers the entire rear surface of target structure 23 to provide a convenient means for maintaining the target structure at a given operating potential and to reflect light emitted from luminescent layers 28, 37 and 42 toward faceplate 12. As indicated above, the target structure may be supported on a transparent substrate mounted within envelope 11 of tube 10 (FIGURE 1) if desired, although it is much preferred that the target structure be deposited directly on the tube faceplate for best viewing results.

In operation, each of the target elements of groups 26, 35, and 40 substantially attenuates ambient light other than that of the primary color which the target elements emit when subjected to electron bombardment. Much of the ambient light impinging upon target structure 23 is absorbed in filter layers 27, 36 and 41, giving improved contrast values in the image reproduced upon the target structure and giving improved color saturation under high-level ambient viewing conditions. The brightness of the image is not, however, substantially attenuated, since each of the color filter layers has a relatively high transmission efficiency for the light emitted by its associated phosphor layer. Consequently, an effective increase in brightness and contrast is achieved without actually producing any additional light from the luminescent material of the target structure and at the same time the adverse effect of ambient light is reduced to a minimum. As indicated by the characteristic curves of FIGURE 3, it is not necessary to employ color filters having particularly sharp cut-off characteristics which transmit light substantially restricted to the desired primary colors, although, of course, the color filter elements may also be employed to modify the effective predominant wavelength of light from any of the phosphors somewhat if this proves desirable. In addition, any contamination of any one of phosphor layers 28, 37 and 42 with either of the other luminescent materials does not produce color desaturation in the reproduced image, since any undesired light emitted from the phosphor is substantially eliminated by the associated color filter layer.

Figure 4:
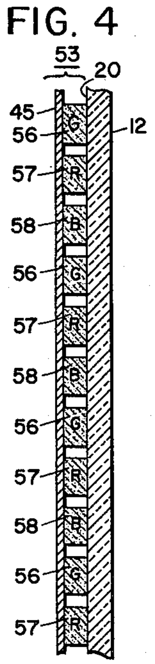
FIGURE 4 is an enlarged cross-sectional view, similar to FIGURE 2, of another embodiment of the multi-color target structure of the invention.

FIGURE 4 shows another embodiment of a tri-color target structure constructed in accordance with the invention; the target structure 53 is again preferably supported upon the internal surface 20 of faceplate 12. In this embodiment, discrete layers of color filter and color phosphor material and are not employed, rather, each of a first group of color target elements 56 comprises a mixture of luminescent material and a color filter material having a selective color-transmission characteristic corresponding to the emission characteristic of the phosphor. For example, in a conventional target structure, target elements 56 may comprise a mixture of a phosphor which emits light corresponding to the selected green primary and a color filter material which has a high transmission efficiency for green light and a relatively low transmission efficiency for the remainder of the visible spectrum. The two materials should be intimately mixed with each other and the color target element should be thick enough so that at least a portion of the color filter material is interposed between the greatest portion of the luminescent material and faceplate surface 20. Target structure 53 further includes a second group of color target elements 57 and a third group of color target elements 58; target elements 57 and 58 are both essentially similar in construction to elements 56 except that their constituent materials emit and selectively transmit light of the other two primary colors selected for image reproduction. As in the case of target structure 23 (FIGURE 2), the electron-gun side of target structure 53 is preferably covered with a thin conductive film 45 of aluminum or other suitable material.

In operation, target structure 53 functions in much the same manner as the previously described embodiment; the filter material included in each of the color target elements absorbs ambient light of wavelengths outside a relatively narrow spectral range including the primary color light emitted by the phosphor of the color target element. Consequently, much of the ambient light impinging upon the screen is effectively absorbed with a resultant increase in contrast values and little or no loss in total image brightness. This particular embodiment of the invention is not as efficient in operation as the embodiment of FIGURE 2, since a portion of the impinging light may be reflected by the phosphor material without absorption and the color filter material may inhibit impinging electrons from reaching the luminescent material, thus reducing the total light output; on the other hand, this embodiment may be somewhat easier and more economical to construct.

Figure 5:
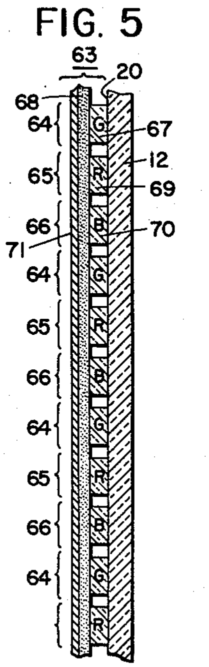
FIGURE 5 is a cross-sectional view of a further embodiment of the invention.

FIGURE 5 shows a further embodiment of the invention which in many respects is substantially similar to color target structures which have been proposed in the past. Target structure 63 is similar to targets 23 and 53 in that it comprises first, second and third groups of color target elements 64, 65 and 66. Target elements 64 are similar to target elements 26 of the embodiment of FIGURE 2 in that they each comprise a discrete layer 67 of color filter material interposed between surface 20 of faceplate 12 and a layer of luminescent material 68. In this embodiment, however, the luminescent material is not a color phosphor; rather, target structure 63 utilizes a substantially homogeneous layer of a luminescent material which, when subjected to electron bombardment, emits light in all three of the primary colors selected for image reproduction. Color target elements 65 each include a discrete layer 69 of different color filter material interposed between luminescent material layer 68 and faceplate 12, whereas target elements 36 each include a color filter layer 70, which selectively transmits a third primary color, interposed between the phosphor and the faceplate.

Screen structure 63 is not nearly so desirable from a colorimetric standpoint as the embodiments of FIGURES 2 and 4, because color values in the reproduced image are entirely dependent upon the transmission characteristics of the color filters, there being no provision for selective emission of light of only one color at each of the target areas. On the other hand, it may offer some advantages in fabrication as compared with target structure 23, due to the reduced complexity of the screen structure; these advantages are not particularly important as compared with the even simpler structure of target 53.

The distinguishing feature of target structure 63, as compared with prior art arrangements, is the particular material employed for color filter layers 67, 69 and 70. As indicated above, peviously proposed filter materials have been generally unsuitable for use within a vacuum tube such as tube 10 and the use of color filters deposited on the external surface of faceplate 12 is highly undesirable because of the parallax problems presented. Color filter layers 67, 69 and 70 are formed from a comminuted vitreous color filter material which is fused to the internal surface of faceplate 20.

The vitreous materials used for the color filters should have a relatively low fusing temperature of the order of 430° C. and are commercially available from several glass manufacturers, being frequently designated by the term "solder glass." For example, Corning Glass #7570, available from the Corning Glass Works, may be used as the basic vitreous material, as may Corning Glass #8363; the latter commercially available glass is particularly suitable because it has a thermal expansion coefficient which matches that of the glasses usually used in color cathode-ray tube envelopes. Another similar type of glass is available from the Kimball Glass Co. under the designation No. 50 solder glass; like Corning #8363, this is a low-fushion-temperature glass intended for use in bonding envelope sections to each other. These glasses are lead borate type glasses. Suitable inorganic colorants are added to the basic vitreous material to provide the desired color-filtering characteristics; for example, cobalt oxide may be used as a colorant for blue filter elements, copper oxide or chromium oxide for green, and cadmium sulphide for red.

Similar vitreous filter materials are preferably employed in all of the different embodiments of the invention, including the previously described target structures 23 and 53. The vitreous filter materials are advantageous for several different reasons; as noted above, they are quite suitable for use within a high-vacuum cathode-ray tube, as contrasted with conventional materials. In addition, they are especially useful because they can be applied to the surface of a substrate such as faceplate 12 by techniques essentially similar to those conventionally employed in depositing phosphor color target elements such as the color phosphor layers 28, 37 and 42 of target structure 23. This characteristic is particularly important because it is necessary, in virtually all practical color television picture tubes, to deposit the individual target areas in a precise and regular geometric pattern in which the dimensions of the individual target elements are rigidly controlled. Moreover, the target elements themselves are extremely small in size; for example, in a "dot" type screen there may be several hundred thousand individual target elements in the image screen area of a picture tube of conventional size. The low fusing temperature of the vitreous materials is also extremely advantageous because it permits fusing of the filter layers in the course of normal tube processing and does not require processing temperatures which would damage conventional phosphor materials.

*Process*

Figure 6:
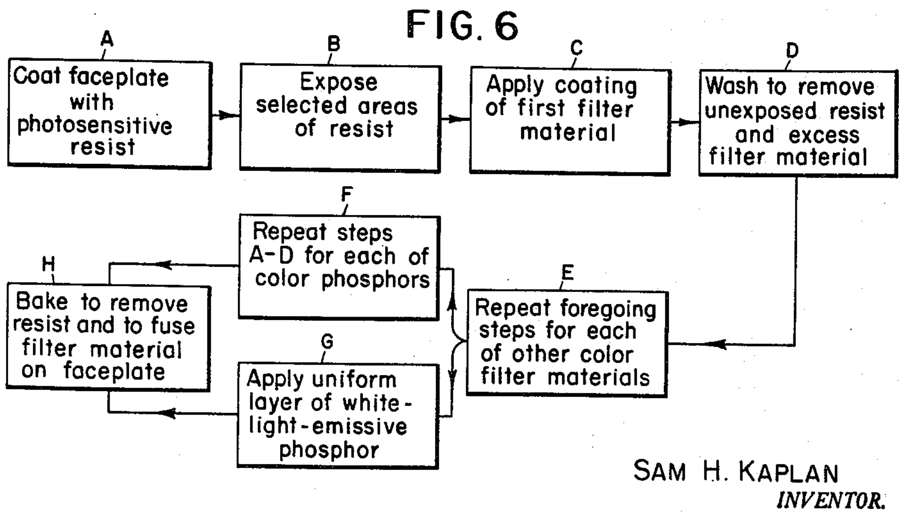
FIGURE 6 is a flow chart illustrating the process steps employed in one method of fabricating the target structure.

FIGURE 6 is a flow chart showing the major steps in one process which may be employed to fabricate either of screen structures 23 and 63. Because each step of the process is subject to substantial variations and may include a number of subsidiary steps, depending upon a number of factors, the major steps are set forth hereinafter in individual paragraphs correlated with the correspondingly designated portions of the flow chart.

A. Coat faceplate with photosensitive resist.

In the first stage of this particular process, the internal surface 20 of faceplate 12 (FIGURE 1) is coated with a uniform layer of a photosensitive resist. A wide variety of suitable resist materials are available in the art, each of which has a predetermined solubility characteristic in a preselected solvent. For example, the resist material may comprise properly sensitized gum arabic, albumin, photographic gelatin or polyvinyl alcohol. All of these particular materials are normally soluble in water but may be made substantially insoluble in water by subjecting them to radiations of predetermined wavelength. In addition to these materials, there are a number of initially alcohol-soluble resist materials suitable for use in color-screen processing and there are also known so-called "inverse" resist materials which are originally insoluble in water, alcohol, or other particular solvents but which may be exposed to become soluble. A typical example of the "inverse" type of resist is a bichromate colloid containing a colloidal dispersion of water-soluble acrylate resin, which may be irradiated to become water soluble.

Of the wide variety of available materials, the use of polyvinyl alcohol sensitized with ammonium dichromate or diazo sensitizers is preferred; the sensitized polyvinyl alcohol is an excellent resist material for a production process because it is not easily exposed by light from conventional illumination sources, being primarily sensitive to light in the blue and ultra-violet ranges. Diazo sensitizers are preferred whenever lead-borate type glasses are used for the color filter materials, since these glasses are somewhat unstable in the presence of ammonium dichromate and may react with the dichromate sensitizer to form lead dichromate, a brilliant yellow pigment. A relatively high level of ambient illumination may be employed in working areas during photographic stages of the process, using a light source such as yellow fluorescent lamps, without accidentally exposing the resist; moreover, the resist may be kept for several days after sensitization before it begins to change its solubility characteristics without exposure. In applying the resist to the faceplate surface, in a preferred process, approximately 100 cc. of a sensitized resist solution is applied to the internal faceplate surface, after which the faceplate is rotated, coated side down, about a transverse axis preferably corresponding to the envelope axis for approximately two minutes at 75 r.p.m. to spin the coating and form a thin uniform resist layer. Excess resist solution is forced to the periphery of the faceplate where it may be caught and removed. The resist coating is then dried with warm air or, if preferred, may be permitted to dry at ordinary room temperatures.

B. Expose selected areas of resist.

After the resist coating has been applied to the faceplate surface, it is exposed through a suitable master pattern to alter the solubility characteristics of predetermined portions of the resist coating and establish in the resist a solubility pattern in which the portions corresponding to the desired multiplicity of target areas for one color group are relatively insoluble as compared with the remaining portions of the resist. In a conventional resist process, it is the target areas themselves which are subjected to radiation and in which the solubility characteristic is altered. Thus, using the preferred polyvinyl alcohol resist, the desired target areas for a given color group are irradiated with blue and/or ultra-violet light for a sufficient time to render them relatively insoluble in water. The radiation source, for example, may comprise a pair of tungsten electrodes spaced approximately 3/32 inch apart; an electrical discharge is established between the two electrodes and argon is blown through and around the arc gap to protect the tungsten from oxidation. A preferred structure for the light source is described and claimed in the copending application of Theodore S. Noskowicz, Serial No. 501,591, filed April 14, 1955, now Patent 2,819,427 issued January 7, 1958, entitled "Light Source" and assigned to The Rauland Corporation. Exposure time should be of the order of approximately 2.5 minutes with an arc current of 45 amperes, although this is subject to some variation; preferably, the exposure is timed to make the target areas somewhat tacky when wet with water but almost completely insoluble in water. The timing for a particular resist material of given thickness is readily determinable by one or two trial runs.

C. Apply coating of first filter material.

In the next stage of the process of FIGURE 6, a coating of a comminuted vitreous color filter material of the type described hereinbefore is applied to the resist coating. The filter powder may be settled onto the coated screen surface through a liquid column comprising water and potassium silicate with a suitable electrolyte in a manner precisely analogous with the settling techniques utilized in applying phosphor powders to the faceplates of conventional monochrome or color picture tubes. This process is very well known in the art and is subject to many variations; accordingly, it need not be described in detail here. The coating of color filter material may also be applied to the photosensitive resist in the form of a relatively thick slurry or suspension in water or other liquid carrier or it may be applied as a relatively low pressure spray. Where spraying techniques are employed, it may be preferable to utilize a non-aqueous liquid carrier (alcohol may be employed) for the color filter material, inasmuch as the glass frits employed as color filters are slightly soluble in water. When this technique is utilized, the color filter coating is preferably subjected to a water mist spray after application.

D. Wash to remove unexposed resist and excess filter material.

When the coating of color filter material has been applied to the exposed resist coating and has been suitably dried, it is subjected to a high pressure water spray to remove the portions of the resist which have not been exposed and which consequently are relatively soluble in water. Of course, where a different solvent is employed for the resist, development of the target area pattern should be carried out with that same solvent; where "inverse" resists are utilized it is the unexposed portions of the resist which are washed away. At the same time, excess color filter material which has been deposited on the resist is removed. This development wash may be applied to the exposed resist coating before the coating of vitreous color filter material is applied, in which case it is necessary to wash the tube again after application of the color filter coating to remove filter material which may settle upon or otherwise be applied to those portions of the faceplate surface not covered with the exposed resist.

E. Repeat foregoing steps for each of other color filter materials.

After steps A–D have been carried out using one of the selected vitreous color filter materials, they may each be repeated for the other two filter materials selected for a tri-color screen. Of course, if a two-color reproduction process is to be employed in the image reproducer, it will only be necessary to repeat those steps one time for the second color filter material. Different target areas on the image screen are exposed, so that the second and third color filter materials are deposited upon different portions of the target surface in a predetermined pattern intermingled with the target pattern formed by the first group of color target areas.

F. Repeat steps A–D for each of color phosphors.

At this stage in the tube process, the succeeding steps are determined by the type of screen structure to be formed. Where it is desired that the resulting screen structure correspond to that of target structure 23 of FIGURE 2, it is necessary to apply the color phosphor layers 28, 37 and 42 individually so that each color phosphor layer is superimposed upon a corresponding color filter layer. The process may be essentially identical with that described above; in each instance, care must be taken to keep the individual color phosphor layers of each color target element in relation to the corresponding color filter layer. Of course, the sequence of process steps and the precise technique employed in conjunction with each may be varied somewhat from that utilized in depositing the color filter materials; for example, if the color filter material is applied by a spraying process it is not necessary to spray-coat the phosphor materials; rather, they may be applied by settling or by slurry techniques. A preferred method for depositing the color phosphor materials, generally corresponding to the preferred method steps indicated above for the color filter frits, is described in explicit detail and claimed in the copending application of Sam H. Kaplan and Theodore S. Noskowicz, Serial No. 463,176 filed October 19, 1954, entitled "Method of Manufacturing Luminescent Screens" and assigned to the same assignee as the present application.

G. Apply uniform layer of white-light-emissive phosphor.

This is an alternate step with step F and is utilized when it is desired to produce a screen structure of the type illustrated by target 63 of FIGURE 5. Conventional techniques may be utilized to apply the uniform white-light-emissive phosphor layer 68 to the color filter structure formed in steps A–E; for example, the phosphor layer may be settled directly upon the color filter materials. Preferably, however, a relatively thin film of organic material such as nitrocellulose is first applied to the color filter materials in the same manner as is generally used in aluminizing picture tubes. This organic film should be insoluble in water and should cover the image screen area completely so that the phosphor layer may be settled directly onto the image screen area and will not penetrate into areas between the individual color filter layers. This technique substantially reduces the inevitable color desaturation presented in a screen structure such as target 63.

H. Bake to remove resist and to fuse filter material on faceplate.

After all of the color filter and luminescent materials have been applied to the picture tube faceplate as set forth above, the faceplate surface is subjected to an elevated temperature for a substantial period of time to volatilize and remove the remaining insoluble portions of the various resist coatings still present thereon. The same bake-out stage of the precess fuses the comminuted vitreous material comprising the color filter layers and thereby forms a multiplicity of individual fused vitreous color filters on the desired color target areas. At this stage of the process, the choice of resist material becomes critical, since this material must volatilize substantially completely so that it can be evacuated from the tube envelope and will not adversely affect subsequent tube operation. It is this characteristic of the preferred polyvinyl alcohol resists which makes them particularly desirable for use in the inventive process, although other resist materials may be utilized successfully. The bake-out temperature may be of the order of 430° C. and preferably should not exceed the glass envelope annnealing temperature, usually about 460° C. since excessive temperatures may seriously damage the luminescent material of the target structure or deform the glass envelope. It is not necessary to wait until the entire series of screening steps set forth above has been completed before baking the screen; rather, it may be desirable to subject the screen to two or more bake-out processes. For example, the resist may be baked out and the color filter frits may be fused before the color phosphors are deposited on the target to prevent intermingling of phosphor and filter materials, or individual bake-out steps may be carried out after application of each of the color filter and/or color phosphor materials. However, it is usually more economical to fuse the color filter materials and remove the resist in one step, since this effects substantial economies in furnace time and space. After the original bake-out, the picture tube is subjected to the usual filming and metal-evaporation processes or other suitable process steps to form the desired electron-transparent conductive coating 45 (FIGURES 2 and 4) or 71 (FIGURE 5) on the electron-gun side of the target structure. As a part of this conventional aluminizing process, the faceplate surface is usually subjected to a final baking at approximately 380° C. to remove the nitrocellulose or other organic film utilized to support the conductive film during evaporation.

Figure 7:
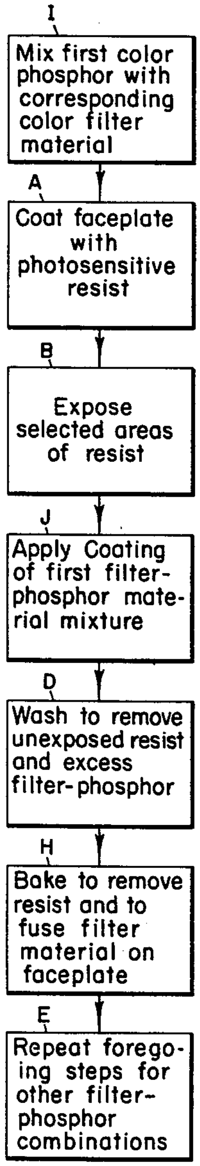
FIGURE 7 illustrates the procedure followed in another method of making the target structure.

FIGURE 7 illustrates a second manufacturing process. In this process, which is in many respects essentially similar to that described above in connection with the flow chart of FIGURE 6, a number of the process steps have been somewhat modified and others are replaced entirely by distinctive procedural stages. The process of FIGURE 7 is particularly intended for use in fabricating a luminescent target of the type illustrated by target structure 53 of FIGURE 4.

I. Mix first color phosphor with corresponding color filter material.

In this particular process, the comminuted vitreous color filter material is intimately mixed with color phosphor material for each of the different primary color target elements. Thus, for red target elements 56 of target structure 53 (FIGURE 4) a color phosphor such as zinc phosphate activated by manganese is thoroughly mixed with the glass frit which is to be fused to form the red color filter layers.

A. Coat faceplate with photosensitive resist.

As in the previously described method, the internal surface of the cathode-ray tube faceplate is first coated with a thin uniform layer of a photosensitive resist having a predetermined solubility characteristic in a preselected solvent, preferably water.

B. Expose selected areas of resist.

After the faceplate has been coated with the selected resist material, and dried, it is exposed through a master pattern to alter the solubility characteristics in predetermined portions of the resist and form in the resist a series of islands in a pattern corresponding to the desired color target elements of one color group which are relatively insoluble as compared with the remainder of the resist coating. This process step is also described in detail above.

J. Apply coating of first filter-phosphor material mixture.

After the faceplate has been coated with resist material and exposed, the mixture of color filter and color phosphor material formed in previously described step I is coated upon the faceplate surface. This powdered mixture of the two materials may be applied by settling, spraying, or slurry techniques as described in step C in the process set forth in connection with FIGURE 6. The settling technique is preferred, although the other two methods can be utilized to produce satisfactory target structures. Moreover, the sequence of process steps A, B and J may be varied substantially. For example, the phosphor and filter mixture may be coated upon the faceplate surface before the resist coating is applied thereto if desired or the phosphor frit may be applied in the resist. Each of these different sequential procedures has certain advantages and disadvantages and each may be utilized to produce satisfactory target structures, although the sequence of procedural steps indicated in the flow chart of FIGURE 7 is generally preferred.

D. Wash to remove unexposed resist and excess filter-phosphor material.

This step in the process is essentially the same as the similar step in the method of FIGURE 6; of course, since the filter and phosphor materials are mixed together, any excess of both types of material is removed. As indicated in the description of the process of FIGURE 6, this development step may be carried out before the filter-phosphor material mixture is applied in step J, in which case it is necessary to utilize a second washing procedure to avoid contamination of the other target areas on the screen.

H. Bake to remove resist and to fuse filter material on faceplate.

This stage of the process is essentially identical with previously-described step H of the method of FIGURE 6.

E. Repeat foregoing steps for other filter-phosphor combinations.

To form the other group or groups of color target elements in the composite target structure, each of steps I, A, B, J, D and H are repeated using different combinations of color filter and color phosphor material. In many instances, it will be found preferable to precede the bake-out step H by repeated deposition of the color filter and phosphor materials, so that only one bake-out is required.

Figure 8:
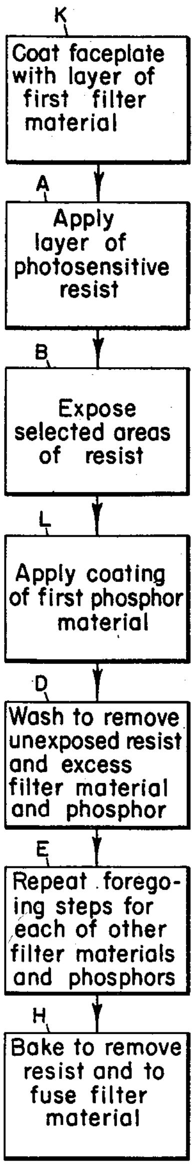
FIGURE 8 illustrates the major steps utilized in another process of manufacturing the apparatus.

FIGURE 8 comprises a flow chart for another method of manufacturing composite filter-phosphor color target structures. In this particular process, the individual steps are all essentially similar to procedures outlined above; accordingly, description of the various procedural steps is held to a minimum. This process however, is distinctly advantageous as compared with the method of FIGURE 6 in that it provides for deposition of discrete color filter and color phosphor layers with only three applications of photoresist material and three exposure stages, as compared with the six complete photographic procedures required in the original method.

K. Coat faceplate with layer of first filter material.

In this particular process, the internal faceplate 20 of faceplate 12 (FIGURE 1) is first coated with a thin uniform layer of the comminuted vitreous material selected for the first group of color target elements. This filter material coating is preferably applied by conventional settling techniques but may also be applied by spraying, slurry methods, or other suitable means. In general, the requirements for this filter-coating step are essentially similar to those of steps C and J of FIGURES 6 and 7 respectively.

A. Apply layer of photosensitive resist.
B. Expose selected portions of resist.
L. Apply coating of first phosphor material.

In this stage of the manufacturing process, a coating of phosphor material having a light-emission characteristic corresponding to the light-transmission characteristic of the first filter material is applied to the coated surface of the faceplate. As in process step K, the phosphor coating may be applied by settling, spraying, or by flowing on in slurry form.

D. Wash to remove unexposed resist and excess filter and phosphor materials.

This step is the development step in the photographic process and is essentially similar to the development steps D of the manufacturing processes of FIGURES 6 and 7. As in the previously-described methods, development of the resist coating may be carried out before application of the phosphor coating, in which case it is necessary to utilize a second washing procedure after phosphor application to avoid contamination of other target areas on the screen surface.

E. Repeat foregoing steps for each of other filter materials and phosphors.

H. Bake to remove resist and to fuse filter material.

Figure 9:
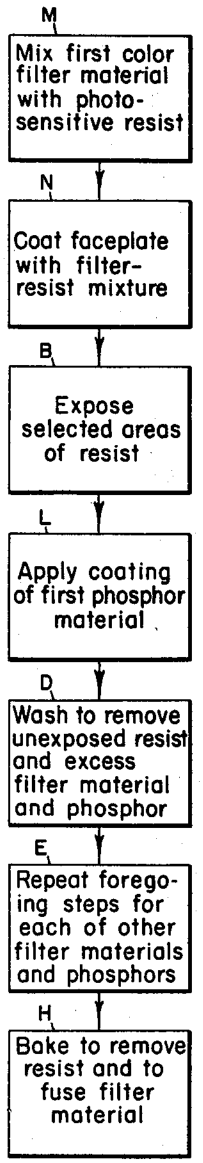
FIGURE 9 is a flow chart showing the principal steps in a further method of manufacture.

FIGURE 9 illustrates, in flow-chart form, another manufacturing method which may be employed in fabricating composite filter-phosphor color target structures.

M. Mix first color filter material with photosensitve resist.

In this particular process, a first selected one of the comminuted vitreous color filter materials is suspended in the photosensitive resist. In effect, a common liquid carrier is employed for both the resist material and the color filter material. For example, where sensitized polyvinyl alcohol is utilized as the resist, it is usually applied in the form of a solution with de-ionized water. The color filter material may also be suspended in this resist solution so that the two materials can be applied to the internal faceplate surface simultaneously.

N. Coat faceplate with filter-resist mixture.

The mixture formed in step M may be applied to the tube faceplate by spraying or by the coating technique described above in the discussion of step A of FIGURE 6.

B. Expose selected areas of resist.
L. Apply coating of first phosphor material.

This step is essentially similar to step L of the process described in connection with FIGURE 8.

D. Wash to remove unexposed resist and excess filter and phosphor materials.
E. Repeat foregoing steps for each of other filter materials and phosphors.
H. Bake to remove resist and to fuse filter materials.

Figure 10:
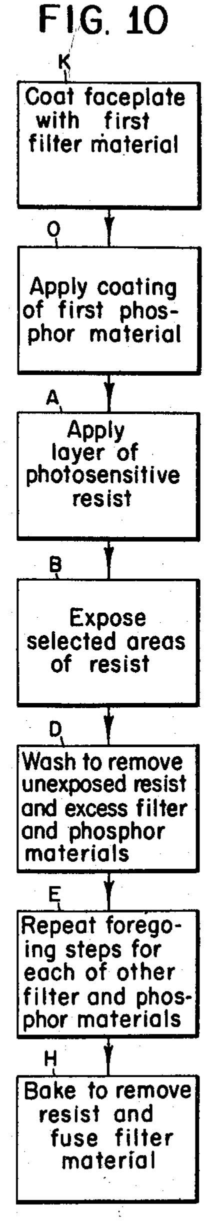
FIGURE 10 is a flow chart illustrating still another process of fabrication.

The flow chart of FIGURE 10 illustrates the major steps in still another method of fabricating apparatus of the invention. This process, like those described above in connection with FIGURES 8 and 9, provides for deposition of discrete layers of color filter and phosphor material in each target element by means of only a single photographic procedure for each of the target element groups.

K. Coat faceplate with first color filter material.

This step in the process may be essentially similar to step K of the method described in connection with FIGURE 8.

O. Apply coating of first phosphor material.

This step in the process may be carried out in a manner essentially similar to that described above in connection with step L in the methods of FIGURES 8 and 9. On the other hand, it may be preferable to combine this stage of the process with step K and to accomplish both coating procedures in a single settling step. It is well known that the rate of deposition of material in a conventional settling process is dependent upon the size of the particles of the settled material. Consequently, the first color filter material and the corresponding color phosphor may be settled onto the tube faceplate through a common liquid column; if the color filter material particles are substantially larger than the phosphor particles they will settle out much more rapidly and will form a substantially discrete layer of filter material interposed between the phosphor and the faceplate surface. Of course, where it is not desired to maintain this distinction in particle size, the two different materials may be settled onto the faceplate surface in the proper sequence by adding them in sequence to a liquid settling column.

A. Apply a layer of photosensitive resist.
B. Expose selected areas of resist.
D. Wash to remove unexposed resist and excess filter and phosphor materials.
E. Repeat the foregoing steps for each of other filter and phosphor materials.
H. Bake to remove resist and fuse filter material.

In several of the processes set forth in detail above, control of the exposure time of the photosensitive resist may be relatively critical, and this process may be made more difficult by the fact that the resist material is intermingled with color filter and/or color phosphor materials. When this is the case, it may be desirable to expose the entire resist layer for a relatively short period of time less than that necessary to produce any substantial hardening of the resist. This "pre-exposure" technique may be of considerable assistance in obtaining precise control over exposure of the desired areas in forming a given target element group, particularly in a process where it is desired to expose the resist until it is partially hardened and of tacky consistency but not completely hardened.

Although there are some significant differences between the processes set forth in connection with each of FIGURES 6–10, the several methods are in most respects essentially similar to each other as indicated by the repetition of various critical steps in each of the flow charts. The methods of FIGURES 9 and 10 are particularly advantageous in that they permit reduction of the critical stages of the manufacturing processes to a bare minimum. Moreover, these particular processes are as flexible as each of the others in the sequence of process steps; for example, stages D and L may be interchanged in the process of FIGURE 9, stages K and O may be combined in FIGURE 10, and steps E and H may be interchanged in sequence in either of the two processes. Each of the various methods may be utilized to produce a color target structure in which the geometric patterns of the individual color element groups are accurately controlled and in which the dimensions of the individual target elements are also closely controlled. The processes employed are not substantially greater in complexity than those utilized in the manufacture of conventional color picture tubes, particularly when advantage is taken of the process economies provided by the methods set forth in connection with FIGURES 8, 9 and 10.

While particular embodiments of the apparatus of the invention have been shown and described, modifications may be made, and it is intended in the appended claims to cover all such modifications as may fall within the true spirit and scope of the invention.

I claim:

1. A multi-color target structure for a color television image reproducer of the type comprising an evacuated envelope having a transparent faceplate, a multi-color luminescent target positioned within said envelope for viewing through said faceplate, and means for subjecting said target to controlled electron bombardment to produce an image thereon in a plurality of primary colors, said target structure comprising: a first color target group comprising a multiplicity of first target elements distributed in a predetermined geometric pattern throughout a preselected image screen area, each of said first target elements comprising a luminescent material which emits light predominantly in a predetermined spectral range restricted to a first one of said primary colors when subjected to electron bombardment and a color filter material which exhibits a relatively high transmission efficiency for light in said predetermined spectral range and a relatively low transmission efficiency for light in the remainder of the visible spectrum, said color filter material being in intimate contact with said luminescent material and at least partially interposed between said luminescent material and said transparent faceplate; and a second color target group comprising a multiplicity of second target elements interspersed, throughout said image screen area, with said first group of color target elements, each of said second target elements comprising a combination of luminescent material and color filter material similar to said first target elements except that the constituent materials of said second color target elements emit and selectively transmit light of a second one of said primary colors.

2. A multi-color target structure for a color television image reproducer of the type comprising an evacuated envelope having a transparent faceplate, a multi-color luminescent target positioned within said envelope for viewing through said faceplate, and means for subjecting said target to controlled electron bombardment to produce an image thereon in a plurality of primary colors, said target structure comprising: a first color target group comprising a multiplicity of first target elements distributed in a predetermined geometric pattern throughout a preselected image screen area, each of said first target elements comprising a luminescent material which emits light predominantly in a predetermined spectral range restricted to a first one of said primary colors when subjected to electron bombardment and a color filter material which exhibits a relatively high transmission efficiency for light in said predetermined spectral range and a relatively low transmission efficiency for light in the remainder of the visible spectrum, said color filter material being substantially uniformly mixed with said luminescent material with at least a portion of said color filter material interposed between a portion of said luminescent material and said transparent faceplate; and a second color target group comprising a multiplicity of second target elements interspersed, throughout said image screen area, with said first group of color target elements, each of said second target elements comprising a combination of luminescent material and color filter material similar to said first target elements except that the constituent materials of said second color target elements emit and selectively transmit light of a second one of said primary colors.

3. In a multi-color display device for developing an image in a plurality of primary colors, a light producing structure comprising: a first color group comprising a multiplicity of first elements distributed in a predetermined geometric pattern throughout a preselected image area, each of said first elements including a luminescent material which under excitation emits light predominantly in a predetermined spectral range restricted to a first one of said primary colors and a color filter element which exhibits a relatively high transmission efficiency for light in said predetermined spectral range and a relatively low transmission efficiency for light in the remainder of the visible spectrum, said color filter material being in intimate contact with said luminescent material; and a second color group comprising a multiplicity of second elements interspersed throughout said image area with said first group of elements, each of said second elements comprising a luminescent material which under excitation emits light predominantly in a second predetermined spectral range restricted to a second one of said primary colors.

4. In a multi-color display device for developing an image in a plurality of primary colors, a light producing structure comprising: a first color group comprising a multiplicity of first elements distributed in a predetermined geometric pattern throughout a preselected image area, each of said first elements including a luminescent material which under excitation emits light predominantly in a predetermined spectral range restricted to a first one of said primary colors and a color filter element which exhibits a relatively high transmission efficiency for light in said predetermined spectral range and relatively low transmission efficiency for light in the remainder of the visible spectrum, said color filter material being in intimate contact with said luminescent material; and a second color group comprising a multiplicity of second elements interspersed throughout said image area with said first group of elements, each of said second elements comprising a combination of luminescent material and color filter material similar to said first elements except that the constituent materials of said second elements emit and selectively transmit light of a second one of said primary colors.

5. In a multi-color display device for developing an image in a plurality of primary colors, a light producing structure comprising: a first color group comprising a multiplicity of first elements distributed in a predetermined geometric pattern throughout a preselected image area, each of said elements including a luminescent material which under excitation emits light predominantly in a predetermined selectively desired spectral range restricted to a first one of said primary colors and a color filter material comprising a colorant which exhibits a relatively high transmission efficiency for light in said predetermined selectively desired spectral range and a relatively low transmission efficiency for light in the remainder of the visible spectrum but which modifies the overall spectrum of light emitted by said luminescent material, said color filter material being in intimate contact with said luminescent material; and a second color group comprising a multiplicity of second elements interspersed throughout said image area with said first group of elements, each of said second elements comprising a luminescent material which under excitation emits lights predominantly in a second predetermined spectral range restricted to a second one of said primary colors.

6. In a multi-color display device for developing at a predetermined surface an image in a plurality of primary colors, a light producing structure comprising: a first color group comprising a multiplicity of first elements distributed in a predetermined geometric pattern throughout a preselected image area, each of said first elements including a discrete layer of luminescent material which under excitation emits light predominantly in a predetermined spectral range restricted to a first one of said primary colors and a discrete layer of color filter material which exhibits a relatively high transmission efficiency for light in said predetermined spectral range and a relatively low transmission efficiency for light in the remainder of the visible spectrum, said color filter material being in intimate contact with said luminescent material and being interposed between said luminescent material and said predetermined surface; and a second color group comprising a multiplicity of second elements interspersed throughout said image area with said first group of elements, each of said second elements comprising a luminescent material which under excitation emits light predominantly in a second predetermined spectral range restricted to a second one of said primary colors.

7. In a multi-color display device for developing an image in a plurality of primary colors, a light producing structure comprising: a first color group comprising a multiplicity of first elements distributed in a predetermined geometric pattern throughout a preselected image area, each of said first elements including a luminescent material which under excitation emits light predominantly in a predetermined spectral range restricted to a first one of said primary colors and a fused vitreous color filter material including a colorant which exhibits a relatively high transmission efficiency for light in said predetermined spectral range and a relatively low transmission efficiency for light in the remainder of the visible spectrum, said color filter material being in intimate contact with said luminescent material; and a second color group comprising a multiplicity of second elements interspersed throughout said image area with said first group of elements, each of said second elements comprising a luminescent material which under excitation emits light predominantly in a second predetermined spectral range restricted to a second one of said primary colors.

8. In a multi-color display device for developing an image in a plurality of primary colors, a light producing structure comprising: a first color group comprising a multiplicity of first elements distributed in a predetermined geometric pattern throughout a preselected image area, each of said first elements including a luminescent material which under excitation emits light predominantly in a predetermined spectral range restricted to a first one of said primary colors and a color filter material which exhibits a relatively high transmission efficiency for light in said predetermined spectral range and a relatively low transmission efficiency for light in the remainder of the visible spectrum, said color filter material being substantially uniformly mixed with said luminescent material; and a second color group comprising a multiplicity of second elements interspersed throughout said image areas with said first group of elements, each of said second elements comprising a luminescent material which under excitation emits light predominantly in a second predetermined spectral range restricted to a second one of said primary colors.

9. In a multi-color display device for developing an image in a plurality of primary colors, a light producing structure comprising: a first color group comprising a multiplicity of first elements distributed in a predetermined geometric pattern throughout a preselected image area, each of said first elements including a luminescent material which under excitation emits light predominantly in a predetermined spectral range restricted to a first one of said primary colors and a color filter material which exhibits a relatively high transmission efficiency for light in a spectral range broader than said predetermined spectral range but including only light within the spectrum of said first primary color and which exhibits a relatively low transmission efficiency for light in the remainder of the visible spectrum, said color filter material being in intimate contact with said luminescent material; and a second color group comprising a multiplicity of second elements interspersed throughout said image area with said first group of elements, each of said second elements comprising a luminescent material which under excitation emits light predominantly in a second predetermined spectral range restricted to a second one of said primary colors.

10. In a multi-color display device for developing an image in a plurality of primary colors one of which is in the blue spectral range, a light producing structure comprising: a first color group comprising a multiplicity of first elements distributed in a predetermined geometric pattern throughout a preselected image area, each of said first elements including a luminescent material which under excitation emits light predominantly in a predetermined spectral range restricted to said one primary color and a color filter material which exhibits a relatively high transmission efficiency for light in said predetermined spectral range and a relatively low transmission efficiency for light in the remainder of the visible spectrum, said color filter material being in intimate contact with said luminescent material; and a second color group comprising a multiplicity of second elements interspersed throughout said image area with said first group of elements, each of said second elements comprising a luminescent material which under excitation emits light predominantly in a second predetermined spectral range restricted to another one of said primary colors.

11. In a display device having a light emissive surface, the intensity characteristic of the emitted light varying as a function of the wave length thereof, and having a plurality of spaced maxima and minima: optical filter means interposed between said surface and a viewer for improving the contrast of the emitter light in the presence of ambient light, said filter means having a light transmission characteristic which complements the intensity characteristic of the emitted light from said surface, having spaced maxima and minima corresponding respectively with the maxima and minima of said intensity characteristic, said filter means transmitting substantially without attenuation light of the wave-lengths emitted by said surface and attenuating ambient light of wave-lengths other than those emitted by said surface.

References Cited in the file of this patent

UNITED STATES PATENTS

| | | |
|---|---|---|
| 2,416,056 | Kallmann | Feb. 18, 1947 |
| 2,543,477 | Sziklai et al. | Feb. 27, 1951 |
| 2,577,368 | Schutz et al. | Dec. 4, 1951 |
| 2,750,525 | Palmer | June 12, 1956 |
| 2,828,435 | Hoyt | Mar. 25, 1958 |
| 2,858,233 | Yanagisawa | Oct. 28, 1958 |
| 2,861,206 | Fiore et al. | Nov. 18, 1958 |